UNITED STATES PATENT OFFICE.

GOTHARD WYSS AND VINCENT WYSS, OF PITTSBURG, PENNSYLVANIA.

COMPOUND FOR PRESERVING ROPES, &c.

SPECIFICATION forming part of Letters Patent No. 642,033, dated January 23, 1900.

Application filed August 23, 1899. Serial No. 728,238. (No specimens.)

*To all whom it may concern:*

Be it known that we, GOTHARD WYSS and VINCENT WYSS, of Pittsburg, in the county of Allegheny, State of Pennsylvania, have invented a new and useful Composition of Matter to be used for Treating Hemp Products of Every Description, of which the following is a specification.

Our composition, which we make in two qualities, consists of the following ingredients, combined in the proportions hereinafter stated.

The ingredients of quality No. 1 and method of compounding are as follows: twenty-four ounces boiled linseed-oil, twelve ounces melted tallow, and one ounce nitrobenzol.

Mixing recipe: First, put tallow in kettle; second, pour over tallow the linseed-oil, boil until a thin fluid like water; third, then stir in the nitrobenzol until thoroughly mixed. Let cool. Then the grease is ready for use.

The second quality differs from the first in the substitution for a portion of the linseed-oil of an analogous material which affords greater body to the composition. The ingredients of No. 2 and method of compounding are as follows: twelve ounces boiled linseed-oil, twelve ounces melted tallow, twenty-four ounces grease-soap, and one-half ounce nitrobenzol.

Mixing recipe: First, put tallow and grease-soap in kettle and apply heat; second, pour over this mixture after it has melted the linseed-oil, boil all together until a thin fluid like water; third, then stir in the nitrobenzol until thoroughly mixed. Let cool, after which the grease is ready for use.

The term "grease-soap" herein employed comprehends a mixture of pure animal fat with distilled mineral oil, those constituting the only ingredients. The substitution therefor of grease-soap in quality No. 2 for a portion of the boiled linseed-oil constitutes no more than a mere addition to the compound of that which will give greater body to the composition.

Hemp products—such as ordinary ropes, wagon, scaffold, and pulley ropes, ships' ropes, wagon-covers, and engine-hose—are although in very extensive use subject after having been exposed to wet to serious objections. Among those objections there may be three especially enumerated: First, the hempen article becomes hard and stiff and therefore difficult to handle; second, it rips or tears easily, and, third, it decays gradually and being therefore liable to break without warning may in some uses cause great danger. Different means have been from time to time employed to eliminate the objectionable features specified, but such means have effected the elimination of but one or two of said features and none have been sufficient to remove all. The various elements of our composition so coöperate one with another as to remove all of the objectionable features named.

The compound is in the nature of a grease, which may be applied to the outer surface of the article to be treated in any suitable and ordinary manner, so as to thoroughly coat the fibers of the hemp, each of which to which it is applied it effectually protects, and being free from all material that might injure the fiber may be safely relied upon to preserve the same. The first quality is for engine-hose, wagon-covers, tents, barracks, ships' ropes, and the like. The second quality may be employed to advantage for scaffold and pulley ropes, trolley-ropes, hemp straps, and the like. Incidentally this grease is adapted to prevent rust on any material susceptible to such a deposit, and the second quality is also especially adapted for use by mechanics, plumbers, gas and steam fitters to lubricate their cutting-tools and also to be used as a substitute for red lead in packing of gas, water and air pipe couplings.

What we claim is—

1. The herein-described composition of matter, consisting of oil and tallow combined substantially in the manner and in the proportions specified, with a sufficient quantity of nitrobenzol to act as a preservative.

2. The herein-described composition of matter, consisting of boiled linseed-oil and tallow, combined substantially in the manner and in the proportions specified, with a sufficient quantity of nitrobenzol to act as a preservative.

In testimony of all which we have hereunto subscribed our names.

GOTHARD WYSS.
VINCENT WYSS.

Witnesses:
J. F. SHANNON,
ALBION E. BEST.